United States Patent [19]

Singleton, Jr.

[11] Patent Number: 4,938,457

[45] Date of Patent: Jul. 3, 1990

[54] APPARATUS FOR TREATING ALUMINOUS METAL SKIM MATERIAL

[76] Inventor: Ogle R. Singleton, Jr., 14 Lexington Rd., Richmond, Va. 23226-1626

[21] Appl. No.: 373,257

[22] Filed: Jun. 28, 1989

[51] Int. Cl.$^5$ .......................... C22B 21/00; C22B 9/02
[52] U.S. Cl. .................... 266/204; 210/360.1; 266/227; 494/43; 494/60; 494/84
[58] Field of Search .................... 75/24, 68 R, 61; 266/204, 227; 494/43, 60, 84; 210/360.1, 361, 787

[56] References Cited

U.S. PATENT DOCUMENTS

| | | | |
|---|---|---|---|
| 733,378 | 7/1903 | Engel | 233/23 |
| 1,612,585 | 12/1926 | Jackson | 117/101 |
| 1,779,366 | 10/1930 | Bloss et al. | 118/54 |
| 2,415,210 | 2/1947 | Hoefling | 494/84 |
| 2,428,840 | 10/1947 | Estes et al. | 118/52 |
| 3,374,089 | 3/1968 | Robinson, Jr. et al. | 75/68 R |
| 3,537,695 | 11/1970 | Robinson, Jr. et al. | 75/68 R |
| 3,699,918 | 10/1972 | Garrison | 210/241 |
| 4,033,563 | 7/1977 | Jacobs et al. | 266/204 |
| 4,137,073 | 1/1979 | Singleton | 75/68 R |

Primary Examiner—Melvyn J. Andrews

[57] ABSTRACT

An improved apparatus for recovering liquid aluminous metal from hot, aluminous skim comprising a combination of an open-one-end bowl to hold the hot skim and retain the residue after centrifuging, a bowl cover latchable to said bowl and with means to provide one or more controlled peripheral openings between said components which together form a skim centrifuge body, which centrifuge body is suspended and rotatable from a loosely fitting, mating linkage which has arcuate mating surfaces, the upper connecting part of which is connected to a source of rotation said rotational force source being provided with a non-rotating reaction and support surface which is preferably separated from the rotating load-carrying member by at least two, concentric bearings of replicate function and the apparatus preferably further consisting of a liquid collection means which surrounds horizontally the suspended centrifuge body during rotation.

16 Claims, 4 Drawing Sheets

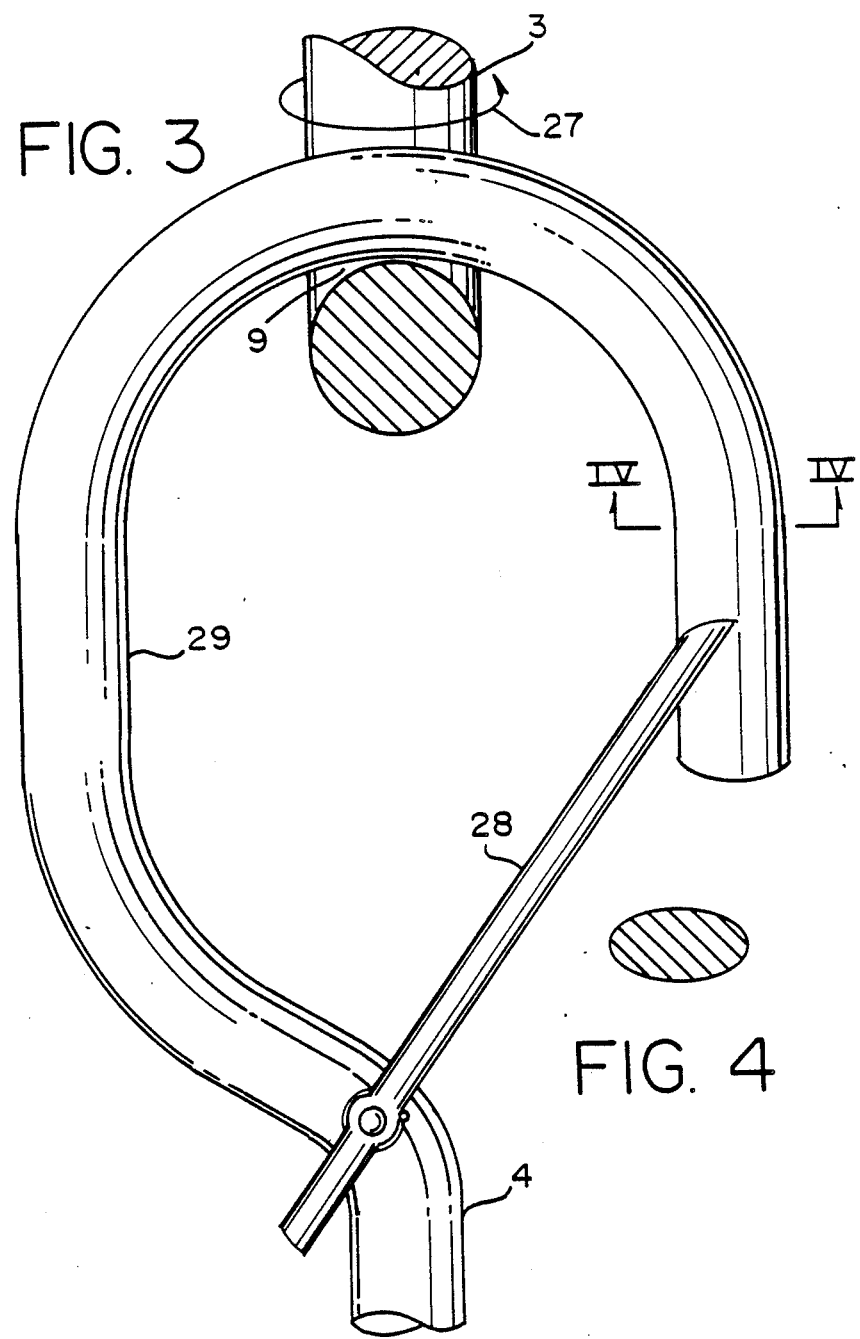

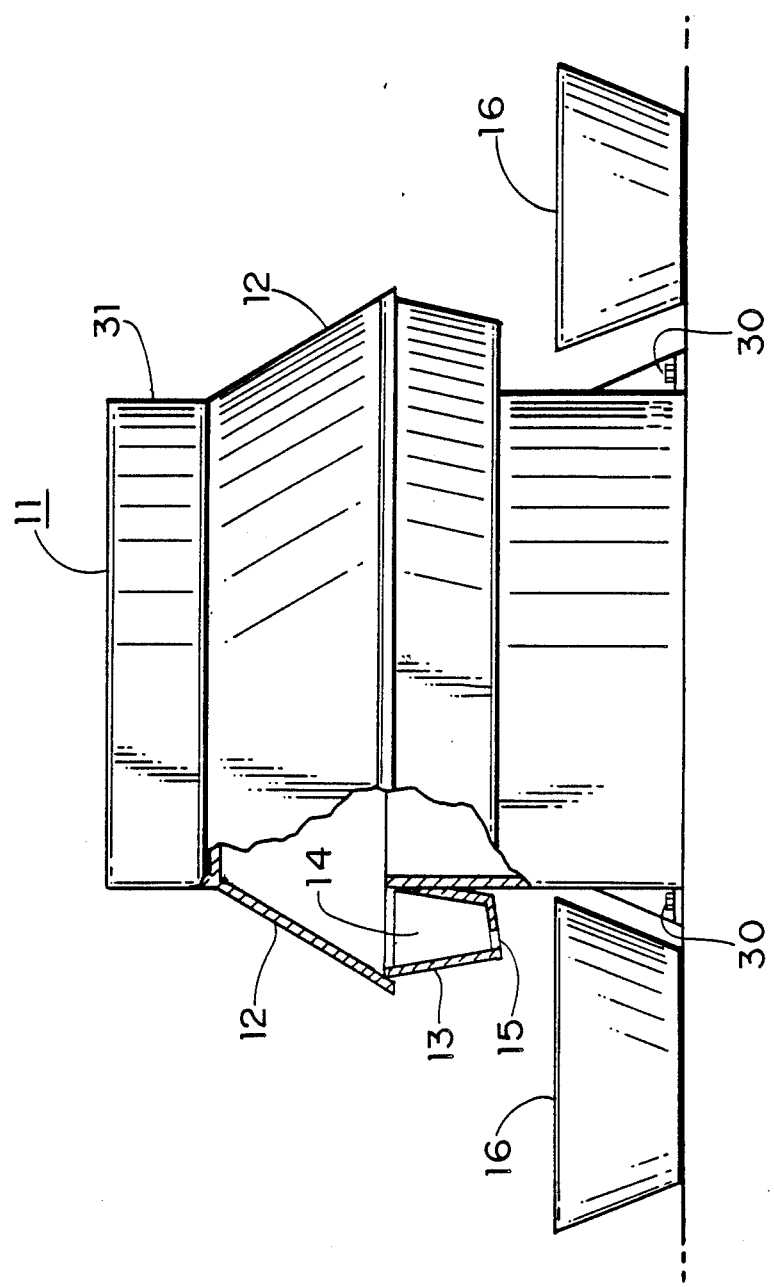

APPARATUS FOR TREATING ALUMINOUS METAL SKIM MATERIAL

This invention relates to an apparatus for recovering liquid aluminum metal from hot aluminous skim.

As used herein the terms aluminum or aluminous include the metal itself and alloys containing aluminum as the principal metal by weight. Percentages as used herein are by weight.

Skim refers to the skim or dross commonly formed on the surface of aluminous melts. Skim is further characterized as a viscous or mushy substance which floats on aluminum melts and usually includes oxide films, entrapped metal and entrained, occluded gases as well as other compounds such as metallic nitrides and carbides. Skim results from such processing as melting solid metal, pouring molten metal and holding a bath of molten metal in an oxidizing environment. Skim usually is found as a separate distinct layer on a melt and, when first formed, commonly contains at least 75% liquid aluminum.

The amount of skim formed in a particular metallurgical operation depends upon factors such as the manner in which that operation was performed, and the elapsed time and the operational temperature. In commercial practice a reverberatory, aluminum melting-furnace can produce skim in the amount up to 1.5% to 5% of the charged aluminum depending to a large extent on the condition, area and thickness of the surfaces of the charged metal.

It has been found useful as an energy conserving operation to remove skim from the metal bath particularly in reverberatory furnaces to improve heat transfer to the molten metal bath from the heating source above the bath. Skim is also removed for such reasons as a means to improve melt quality and as a first step in saving or conserving the metal values contained in the skim.

BACKGROUND OF THE INVENTION

In much of the prior art it has been an object to try to recover the aluminum content of skim by chemical means as the skim rests on the surface of the molten bath. Recovery was believed achieved by fluxing the bath with, say, chlorine gas or other reactive gasses (which may be used also for conditioning the melt) or by distributing over the skim an "exothermic" mixture of fluxes (salts). The result was a skim or dross layer above the melt which was "dry", i.e. it did not contain as much liquid metal as before treatment. The easy and pleasant assumption was that the metal content had been released and had joined the bath below. That assumption was difficult to refute on commercial furnaces because precise accurate material balances were difficult if not impossible to achieve at that scale. However, small scale experiments such as those reported in part by W. R. Ford and N. Christ in "A Study of the Formation and Behavior of Aluminum Skim". The Metallurgical Society of AIME, Technical Paper No. A74-61 have shown conclusively that, with such treatments, much of the metallic portion of the skim either reacted with the chlorine to form gaseous aluminum trichloride, an atmospheric pollutant or became hot enough to react with the atmospheric gases above the skim to form nonmetallic compounds, quantities of which were "fumed" as fines up the furnace stacks. Thus the metal content of the skim was not reclaimed but was converted to base compounds for an economic and energy loss.

Other prior art has shown the efficacy of removing skim from a furnace and either while it is hot or after it has been cooled treating the skim with molten salts of the chloride type with small proportions of fluorides usually added. These methods have a major disadvantage in that the molten salts typically emit pollutant fumes during processing and that the processing residue, which contains metal, metallic oxides and carbides as well as the residual salt, must be further reclaimed or disposed of in a safe and proper manner. The complexity of such processing is readily seen in such prior art as U.S. Pat. Nos. 4,434,142 and 4,523,949. In earlier times such residues could be discarded in dumps since it was not recognized that said salt-contaminated residues were pollutants.

In other prior art, to avoid the problems associated with salt, skim treatments under inert gases have been used as is typified by the work of Dominic Montagna of the United States Bureau of Mines and covered in U.S. Pat. No. 3,999,980. Such methods have the inherent economic disadvantage of requiring the use of inert gas as well as the additional need for protective atmosphere assurance and control.

There are other prior art methods which seek to recover metal directly from the hot skim by mechanical treatment such as by rolling as exemplified by U.S. Pat. No. 4,772,320; by pressing e.g. U.S. Pat. Nos. 4,386,956 and 4,540,163 or by centrifuging U.S. Pat. No. 4,137,073. These mechanical separation and recovery methods are inherently superior to those employing chemicals such as salts or chlorine gas because, inter alia, non-productive, pollution-abatement equipment is not required and are inherently superior to methods which require inert gas covers because the expense and control of the protective atmosphere is not required.

Of the mechanical methods for the recovery of metal values from aluminum skim one of the best is the centrifuge method cited above. The centrifuge method of U.S. Pat. No. 4,137,073 produces an excellent recovery of metal and also produces a low density residue which is much easier to process mechanically to achieve additional useful recoveries than is the residue from pressing or rolling processes which, of necessity, compact their residues into dense solids.

The centrifuge method was tested and confirmed in its recovery and residue processing at prototype scale (at up to about 450-pounds [about 200-kg] of skim per batch) in several commercial plants. To date the centrifuge method has not been used commercially because of problems with the scale up of the equipment to handle unbalanced loads of hot aluminous skim of a practical commercial size i.e. weighing about 1,000-pounds (about 500-kg) or more.

A scale up of apparatus, made as shown in FIG. 6 of the aforesaid patent, was attempted and was abandoned. Some of the unsolved problems encountered in the scale-up were reputed to be difficulty in controlled spinning of an initially unbalanced load (the need for speedy loading of the bowl with skim was to conserve heat and to conserve labor time; speedy loading tended to preclude balancing the load), difficulty of maintaining a controlled spin of the bowl with the changing mass as major amounts of the enriched liquid phase left the rotating bowl and the enriched in solids phase moved and shifted with the bowl during spinning. Hence, this superior centrifuge method has not been used for the reclamation of aluminum skim because the apparatus to practice the method as illustrated in said method patent was not deemed commercially practical by production plant management after it was tried.

The prior art describes many means to centrifuge metal or metal containing mixtures. One company, the Danish Bergsoe Group, has made centrifuges for primary and secondary smelters of non-ferrous metals; however their equipment is covered by a secrecy clause and "must not be sold to any other company without their permission. "Neither must it be copied, and spares—if any—should be ordered from our company"; hence, their apparatus is not known to the art. Others, particularly those in the galvanizing industry, have used centrifuges to remove excess zinc from coated parts e.g. U.S. Pat. Nos. 1,779,366; 2,428,840; and 3,699,918 and others to treat articles in a bath such as U.S. Pat. No. 3,814,117. Galvanizing centrifuging operations are distinctly different from those of aluminum skim reclamation for several fundamental reasons: the amount of liquid to be removed in a galvanizing operation is only that small amount of excess liquid that does not readily drain from the zinc coated, steel parts, thus the amount of liquid removed does not involve more than about 10% by weight of the centrifuge charge, further, the main mass of the centrifuge charge is solid steel parts which are preloaded and usually do not suffer appreciable shifting about during centrifuging; hence, the problems and solutions of the galvanizing art would not be expected to be even remotely suggestive of solutions for centrifuging a semi-solid, usually initially unbalanced, load of mushy, aluminum skim preferably containing 50% or more of separable liquid which results in a bowl-retained, solids-enriched residue which is typically found pressed against the outer walls of the bowl with a center cylindrical region empty.

The prior art also describes many means to drive centrifuges, for example: from below, from the side or from above as in U.S. Pat. No. 733,738. Nevertheless there has not been a single, successful, commercial operation of a skim centrifuge utilizing my invention of the method of U.S. Pat. No. 4,137,073 of which I am aware.

Accordingly, for over ten years what the art has sought, and by various means has attempted to find, is a simple, efficient, rugged apparatus with which to practice the centrifuge method of U.S. Pat. No. 4,137,073 for the recovery of liquid aluminum from hot, aluminum skim. It is an object of this invention to describe a novel apparatus which provides the means to successfully, simply, ruggedly, and efficiently practice the said skim reclamation method.

It is a further object of this invention to describe a novel apparatus which can be used for the centrifugation of other large, initially unbalanced masses of mixed solids and liquids to permit the separation of the mixture into beneficiated portions which involves the removal from the mixture during rotation of at least 20% and up to about 90% of the mixture as a liquid phase and in which a redistribution of the mass of the solid-rich, retained-phase can be accomplished smoothly and without undesirable perturbations of the centrifuge during operation.

GENERAL DESCRIPTION OF THE INVENTION

As noted above, various means have been utilized to treat aluminum skim to recover its inherent values. There is a centrifuge method that is one of the best of those methods. Yet despite the need and the great range of equipment to centrifuge metallurgical material, there has not been a practical, commercial apparatus developed to simply, ruggedly and efficiently centrifuge hot, aluminum skim to recover furnace-quality molten aluminum, without the need to use flux or inert gases, and retain in the centrifuge bowl an easily processable, friable, potentially valuable residue.

In accordance with the broader aspects of this invention, the hot, mushy, semi-solid skim with its aluminum content in the liquid state and containing at least 20% separable liquid and preferably 50% or more but less than 90% separable liquid is raked, skimmed or otherwise transferred into a solid bowl. The bowl is preferably shaped as the frustum of a cone with the larger diameter end at the top and open; however the bowl may be cylindrical or the cross-sectional may be polygonal. The bowl is preheated or made from insulating materials of such low specific heat and thermal conductivity that all or a great majority of the aluminum portion of the skim will remain liquid for processing or may be built of insulating materials and also preheated.

A cover is mechanically affixed, symmetrically to the open area of the bowl such that it covers at least the interior and may overhang the exterior of the bowl and provides a dimensionally controlled, axial gap substantially all around the periphery between the cover and the bowl except where spacers may be located. The means joining the cover and the bowl is such that the cover readily supports the weight of the bowl and its contents and, when the cover is rotated, the bowl and its contents rotate.

The cover is mechanically, firmly connected to a linkable member in the form of a circular eye, an arcuate member or a safety-closed hook rising from the center of the upper surface of the cover. The inner, compound curved surface of the eye, arcuate member or hook is arcuate in cross-section. It can be appreciated by those skilled in the art that the bowl and cover may be inverted, with the connecting link attached to the top surface of the bowl and means provided to form a gap between the cover and the bowl at or after rotation has started or at another prearranged time or event.

A special source of suspension and rotational force is provided through at least one mating, but otherwise similar, connectable hook, arcuate member or eye. The final connectable, linking member is rigidly, mechanically attached to or made as a component of a rotatable shaft which passes into a non-rotating container or housing; both shaft and housing support the main, rotatable mass. At the junction between the rotatable shaft and the non-rotating housing there are preferably at least one set of two, concentric, separate bearings. One bearing functions in the normal manner permitting the shaft to rotate and the housing to remain stationary and to carry the load. The second bearing is capable of the same function. Both bearings may be of the thrust type so that they can bear more readily the load suspended from the shaft. The second of the bearings is preferably held immobile, in reserve, by a mechanical link which has the property of shearing when subjected to a predetermined force of, say, about 50-pounds (about 220-N). The shearable link preferably carries attached to it a means to detect and alarm at the fracture of the link, e.g. an easily frangible thin wire whose breakage causes a conventional alarm system to sound. The purpose of said link is to shear if the initially-free, load carrying bearing should fail in its function so that the momentum force of the spinning centrifuge assembly suspended from the rotating shaft will not be transferred beyond said link's force limit to the non-rotating housing.

The non-rotating housing contains a suitable source of rotational force (and desirably a braking force) connected to both the rotatable shaft and to the non-rotating housing the latter to provide a reaction to the force of rotation or braking imparted to the shaft. The non-rotating housing is connected to a means sufficient to stabilize the housing and prevent it from rotating as a reaction to the force imparted to the rotating system. The stabilization means may be a direct mechanical connection, a mechanically stopped or limited movement device or other means for suppression of rotation. The non-rotating housing may be attached to other devices in such a way as to be mobile both to traverse horizontally and to raise and lower vertically i.e. to move as desired in up to three dimensions.

The skim centrifuge thus consists of three, cooperating main parts: a bowl to contain the skim, a cover for the bowl with means to join the two and provide at least one opening, and a non-rotatable device from which to hang the covered bowl assembly and rotate it in a controlled manner by means of a least two loosely-connected links the surfaces of at least one of which is arcuate in cross-section.

In addition to the skim centrifuge it is useful to have a collecting station for the liquid metallic aluminum which is spun from the skim centrifuge. The preferred embodiment of the collection station consists of an upright, generally cylindrical, opened top container with a vertical axis. The internal diameter of said container is preferably about 1.4 to 2 times the outer diameter of the skim centrifuge and the said container is preferably about 1.5 to 2.5 times the height of the centrifuge bowl. An upper section of said container at about 1 to 1.5 the height of the centrifuge bowl consists of a conical frustum joined at the top to said cylindrical container and replacing the cylindrical wall and tapering outward from the cylinder so as to have a lower diameter about 1 to 2-feet (about 0.3 to 0.6-m) greater than the diameter of said cylinder. The conical frustum section can deflect downwards molten material striking it. Below the conical section and surrounding the lower cylindrical section of the container is mounted a peripheral, generally circular, open trough for collection of the main mass of liquid metal spun from the centrifuge. The peripheral trough is preferably: divided into sections, tapers inward and slopes outward, and is fitted with outlets to permit molten metal to run from the trough to suitable containers provided below.

The collection station may be fitted with heaters and the inner surfaces may be insulated and coated with partitive compounds as is deemed expedient. For safety the collection station should be securely attached to a floor or other firm foundation for stability.

The skim centrifuge preferably is spun while suspended such that its peripheral opening or gap is at a level with the conical frustum region of the collection station. Thus, if some part or unobserved object should spin from the skim centrifuge there would be nothing that escaped the confines of the collection station. The conical frustum section of the collection station may be made in sections which can be made moveable to permit access for cleaning or inspection if desired. It should be appreciated by those skilled in the art that a simplified collection station could be mounted and the centrifuge operated within a furnace chamber to return the metal spun from the container directly to a melt.

BRIEF DESCRIPTION OF THE DRAWINGS

The foregoing and other objects, features, and advantages of the invention will be apparent from the following description of the invention as is illustrated in the accompanying drawings. The reference characters refer to the same parts throughout the different views. The drawings are not to scale and are presented to help illustrate the principles of the invention in a clear manner.

FIG. 3 is a drawing of a preferred, arcuate-surfaced, drive arrangement.

FIG. 4 is a drawing of a section of a drive link member.

FIG. 5 is a drawing of a preferred embodiment of a product collection station for the molten aluminum spun from the skim centrifuge.

DETAILED DESCRIPTION OF THE DRAWINGS

Figure 1:
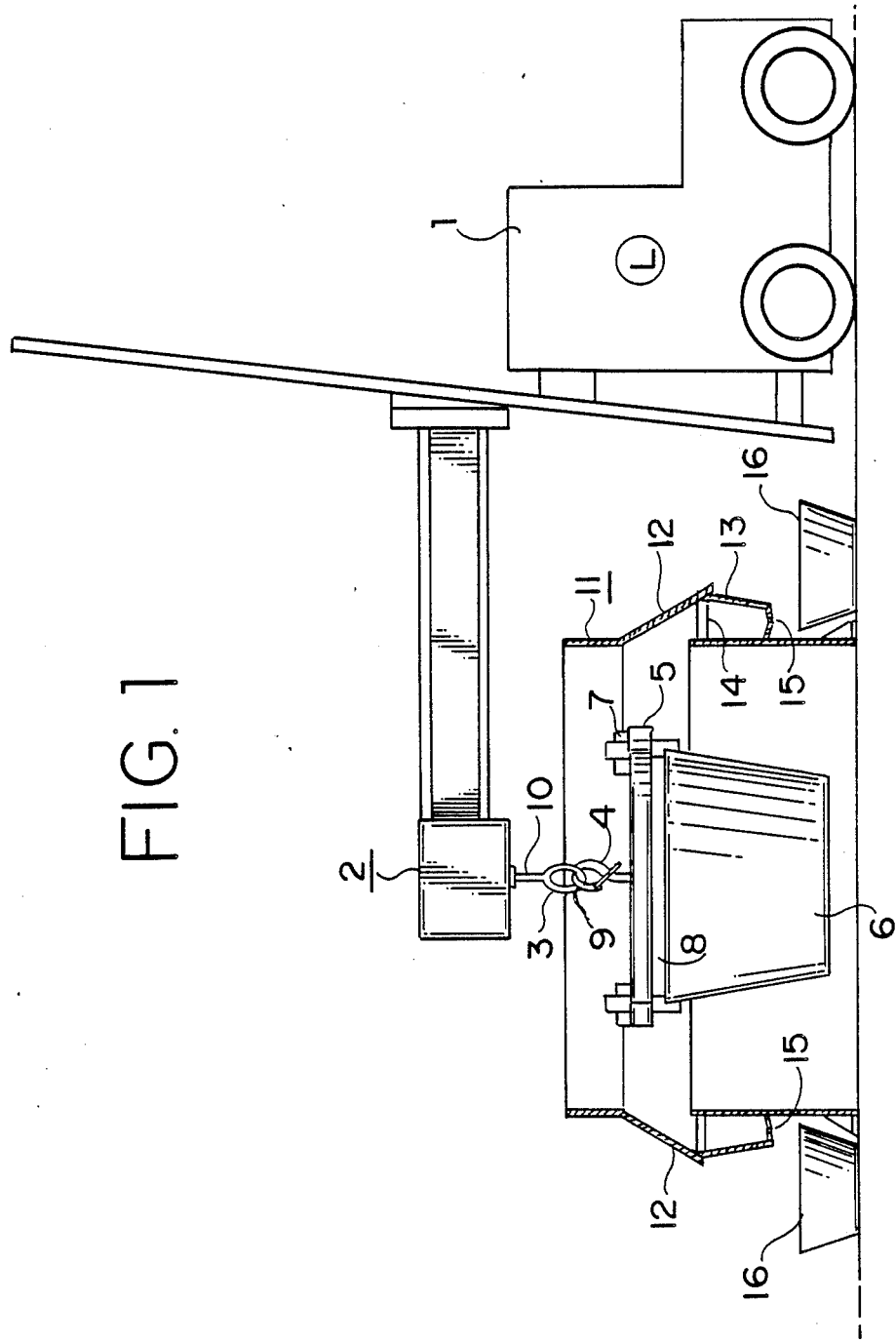
FIG. 1 is a schematic of a typical arrangement of the elements of the apparatus in a position for the spinning of liquid aluminum from the skim centrifuge and the recovery of the aluminum in the collection station and associated containers.

FIG. 1 schematically shows the skim centrifuge ready for spinning with the collection station shown in half-section. For the skim centrifuge to be in the illustrated position the following occurrences provide a typical scenario or example. The pre-heated bowl was filled in a conventional manner by raking hot, mushy skim into the open bowl from a reverberatory melting furnace hearth when the bath first became flat, i.e. melting was just completed under full fire. For heat conservation it is desirable to fill the bowl at least three-quarters full. It is generally impractical to make any attempt to even out or roughly balance the load in a production situation especially as it is desirable to conduct the operation speedily to conserve heat both in the furnace and to keep the metal fraction of the skim in the liquid state. It is also desirable that the bowl not have a central pillar or other impediment to either easy, quick loading or subsequent induced movement of the mushy skim.

A lift-truck, 1, with the attached housing, 2, which contains the rotational force source and with the arcuate surfaced, eye, 3, and hook, 4, suspension for the top cover, 5, was brought up. The cover, 5, was lowered to the bowl, 6, and mechanically locked via locking means, 7, to form a rigid assembly with a dimensionally controlled, peripheral gap, 8, between the two bodies which together comprise the centrifuge body. By means of the lift truck, 1, the centrifuge body was placed as shown in FIG. 1.

Operation of the centrifuge is straightforward. Because the force of gravity is combined with the effect of the compound arcuate surfaces of the hook, 4, and eye, 3, together providing the controlling connection at, 9, between the rotating force and the main rotating mass, the main rotating mass, i.e. the bowl, the top and the appreciably changing and shifting contents of the bowl, will rotate smoothly about its own center of mass. There is no need for the lift-truck boom to orient the hook shaft, 10, vertically as misalignments of at least 10 degrees from vertical can be easily tolerated. Since it is a major object of this equipment to discharge a major amount of the skim load (as recovered aluminum), the main mass changes rapidly as the aluminum is expelled during rotation and the retained mass is shifted in position dynamically during rotation.

With known centrifuge drives, handling large, (over 500-pound), initially unbalanced loads as well as loads which substantially (by over 20% of the initial charge) change balance dynamically is difficult and requires complex and sophisticated means if it can be accomplished at all as is well known in the art. Thus the means of this invention provides an apparatus that is simple, rugged and elegant in its solution to a heretofore perplexing problem.

The skim centrifuge bowl, 6, and cover, 5, were placed inside the confines of collecting station, 11, prior to spinning. This served to protect the surroundings from anything thrown off purposefully or accidently from the centrifuge and served the main purpose of collecting the liquid aluminum forced by rotational forces from the gap, 8, between the top and the bowl and slung in a ballistic trajectory to the slanting deflector walls, 12, of the collection station, 11, and proceeding by deflection and by gravitational force to run into a peripheral collection trough, 13, and containers, 16. After the spin treatment is complete, a matter of seconds or a few minutes at most, the skim centrifuge with its residue is preferably braked and then removed to a holding area for removal of the top, 5. If desired, a suitable, alternative top (not shown) may be fitted to the bowl, 6, for a cooling period prior to unloading the residue contained in bowl, 6. The residue can be a source of valuable by-products.

More specific details of the construction of the apparatus in a preferred embodiment are shown in the remaining figures.

Figure 2:
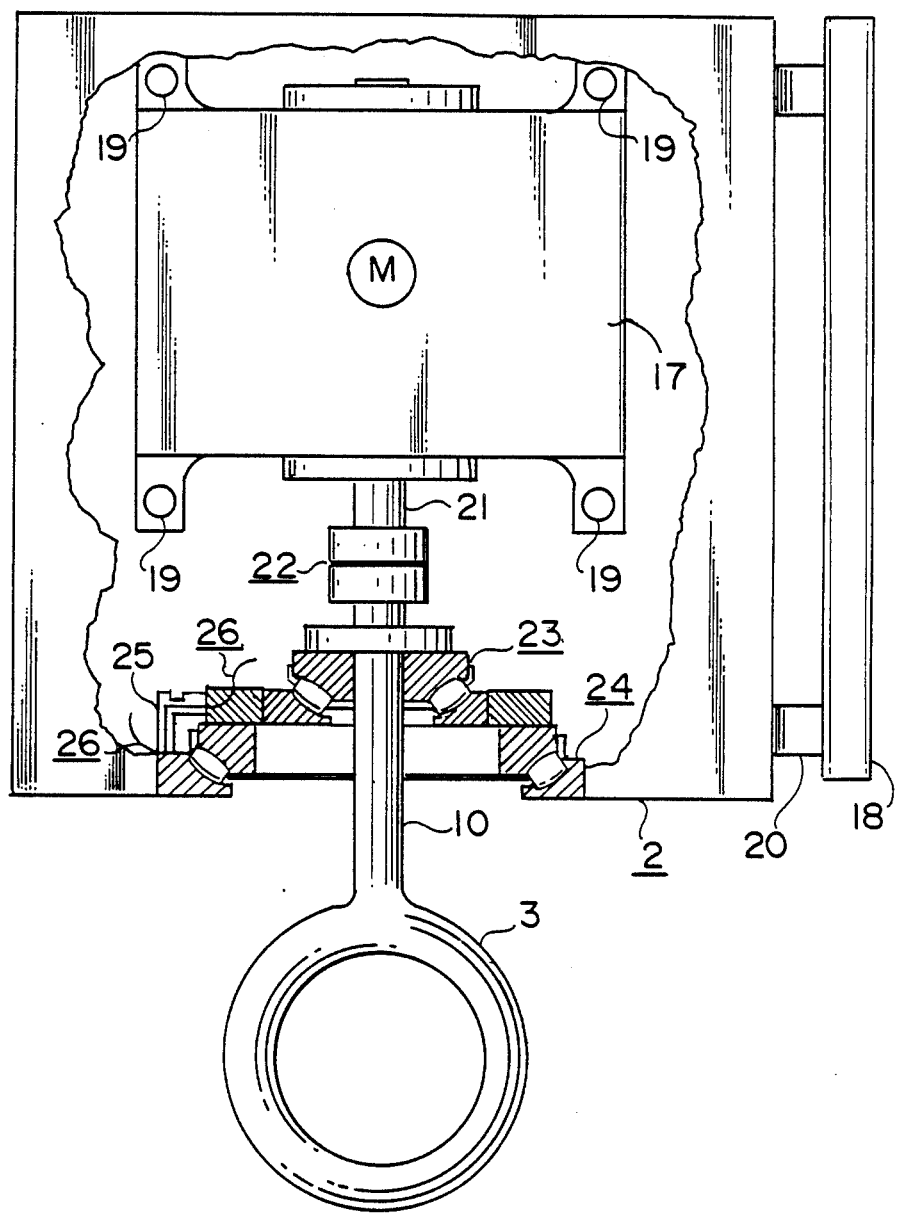
FIG. 2 is a cut-away drawing of a preferred embodiment for providing a suitable force for rotation, a reaction means for that force, and a safety device in case a bearing transmitted excessive rotational force due to failure or incipient failure of its function.

FIG. 2 shows an arrangement inside the non-rotating, load bearing housing, 2 which also serves to house the rotating force. A source of rotational force and braking force, 17, is mounted to a non-rotating reaction support, 18, through one or more connecting members, 19, 2, 20. A rotatable shaft, 21, is connected by suitable, preferably disengagable device, for example an electromagnetic clutch as is well known to the art, 22, to a rotatable, load-bearing eye, 3, via shaft, 10. The rotatable eye, 3, is mechanically separated from the non-rotating housing, 2, by means of two, concentric, load-carrying sets of bearings, 23 and 24. Bearing, 24, is prevented from rotating by a shearable member, 25, which is monitored for integrity by an easily fractured circuit wire, 26. The housing must be non-rotating to provide a reaction for the rotation of the eye, 3. Because the skim centrifuge, to be practical commercially, should treat skim in quantity, the driven mass will likely be over 1,000-lbs (likely over 500-kg). If there were only one, load-carrying bearing in series between the rotating shaft, 10, and the non-rotating housing, 2, and if that load-carrying bearing should fail or otherwise cease to function with a low coefficient of friction, then a destructive amount of rotational force could be transmitted to the non-rotating housing and beyond thereby causing possible serious danger to equipment or people. With two bearings available as shown and, as shown, preferably rigged to alarm if the shear member, 25, is broken, then the assembly is improved in safety for commercial use. Of course, if additional safety is desired, additional independent, concentric bearings (not shown) could be added to the series. A second set of two concentric bearings (not shown) may be added to provide additional stability to the shaft, 10, and the motor shaft, 21, may also be equipped with redundant bearings (not shown).

FIG. 3 is a view of the parts of a hook, 4, and eye, 3, connection between the centrifuge body and the rotational force. The contact between the hook, 4, and eye, 3, at, 9, is desirably as close to a theoretical points or lines of contact as is reasonable in commercial construction. Forces other than pure rotational forces transmitted between these two members, 3 and 4, while they are transmitting rotational force need to be small so that the force of gravity acting on the suspended mass will automatically control the axis of rotation through the center of mass of the suspended mass with a minimum of oscillation or perturbation so that the suspended mass spins within easily predicted and contained limits. Hard, compound-arcuate, contactable surfaces of these members, 3 and 4, and necessarily of at least one of these members, by limiting the area of contact between the links permits smooth, controlled rotation of a heavy (>500-pounds of skim) load that is not initially balanced and that changes significantly (i.e. by more than 20% and usually by 50% or more of the original skim load) in mass and in the retained mass shifts position substantially during rotation. Generally rotation in a commercial unit will be on the order of 300 rpm; however rotational speed will be dependent on diameter as is well known in the art. For safety the hook, 4, preferably has a spring loaded safety closure, 28, as is well known in the art and preferably the straight portion of the hook, 29, should be two or more times the diameter (or breadth) of the solid portion of the eye, 3. Preferably the open, inner diameter of the eye, 3, is about two times or more the cross-section of the mating hook, 4.

FIG. 4 is a cross-section of the compound arcuate hook, 4.

FIG. 5 is a cross-sectional view of a suitable collection station, 11, for the aluminum spun from the skim centrifuge. A preferred station has an inner diameter about 1.4 to 2 times the extreme outer diameter of the centrifuge body (not shown) and a height of about 1.5 to about 2.5 times the height of the centrifuge bowl (not shown). These limits provide sufficient clearance for easy insertion of the skim centrifuge (not shown) and provide for the centrifuge body to be suspended during rotation.

Below the top cylindrical portion, 31, of the station, 11, it is convenient to have a conical frustum deflection shield, 12, for the purpose of deflecting the molten streams (not shown) discharged from the skim centrifuge into appropriate, preferably peripheral channels or troughs, 13, with spacers, 14, and openings, 15, in the troughs, 13, for the liquid, product, metallic aluminum (not shown), to flow, under the force of gravity, into collection pans, 16. The deflector shield, 12, may be hinged in sections or otherwise may be made moveable and lockable in the operative position. The spacers, 14, are desirable to prevent formation of a continuous ring in case the discharged aluminum should solidify in the trough, 13. Such spacers make the task of product removal easier. The deflector shield, 12, may be heated, and coated with a mold release agent to reduce or prevent product adherence. The same is true for the trough, 13, and the opening, 15. The station, 11, may itself be fitted with heat sources such as gas burners (not shown) that play on the gap (not shown) of the skim centrifuge (not shown) to aid in the extraction of metal values therefrom; however, a common sense rule states "the simpler the equipment the better for operation in a commercial cast-house".

EXAMPLE

The following illustrative example of the operation of the apparatus as shown generally in FIGS. 1-5 of the drawings, is for treatment of skim material from a gas-fired, aluminum, melting furnace. The charge was approximately 40% ingot material and 60% scrap alloy AA6061. The burners were operated on full fire until the charge was melted and the melt temperature rose to about 1350 F. The burners were turned off and the door was opened to remove the built up layer of skim on the bath. A hoe-like tool affixed to a lift truck was used to rake the skim to the door, up a hearth incline, over the furnace sill, and down a chute into the skim centrifuge bowl. The temperature of the skim entering the preheated bowl was 1450 F to 1550 F.

The bowl was made of welded, rolled and cut boiler plate, shaped in the frustum of a cone with a closed bottom and open top. The bowl and its upper rim were lined with an aluminum resistant insulating board and preheated with a radiant heater to a temperature of about 1000 F. The bottom internal diameter of the bowl was 30-inches, the top internal diameter was 36-inches, the internal height of the bowl was 28-inches. Approximately 1,000-pounds of skim was used to roughly fill the bowl. Loading of the positioned and preheated bowl required less than three minutes.

The steel top cover was insulated with a layer of commercial refractory board over its bottom, 44-inch diameter surface which had three, insulated spacers, each 0.5-inch high and 3-inches in diameter evenly spaced around its periphery. The bottom surface of the cover was preheated by a radiant heater to about 1,200 F. The top cover was equipped with three evenly spaced locking lugs which could be activated to lock the cover firmly to the bowl and was surmounted with a stainless steel shaft which extended four-inches axially from the upper center of the cover ending in a stainless steel safety hook which had an internal reach of six-inches, an inner diameter of 4.5-inches, and an elliptical, solid cross-section of approximately 2.5-inches × 1.5-inches.

A lift truck of 4-ton lift capacity had been equipped with a boom on its lift platen. On the end of the boom, firmly affixed, was a motor housing which enclosed a slow start, severe duty 15 HP electrical motor with electrical and mechanical braking which was also firmly affixed to the housing. The motor shaft was generally vertical and was connected so as to drive but not support a 2-inch diameter, stainless steel, shaft which was axially aligned with the motor shaft. The stainless steel, load-carrying shaft was supplied with a collar and was fitted to a roller thrust bearing. Below the bearing the shaft ended in a ring or eye of five inches internal diameter and of 2-inch diameter cross-section. The exterior race of the thrust bearing was fitted into a circular plate which was mounted to a second, larger diameter, roller thrust bearing whose outer race was securely mounted to the motor housing and thus to the lift truck boom. A mechanical stop was placed across the races of the second bearing; the stop was crafted so that a force of about 50-pounds in shear would cause the stop to fail and permit the second (reserve) bearing to turn freely. Electrical power was supplied to the motor from a reel of electrical cord on the lift truck which was connected to a plant power source.

The lift truck was utilized to guide the ring of the shaft from the motor housing to engage the hook on the top cover, lift the top cover over the filled skim bowl, lower the cover to contact the bowl. The cover was latched securely to the bowl. These operations were accomplished in less than 3-minutes. The lift truck was again utilized to lift the bowl and top assembly and move them to the nearby collection station and lower the bowl into the collection station yet keep the bowl still suspended. The movement helped to even out the load of mushy skim in the bowl since there was no center post or other impediment to interfere with the natural seeking of equilibrium. The move was completed in less than 1.5-minutes and the mass of skim in the bowl was generally at a temperature of at least 1300 F well above the liquidus temperature of 1205 F for aluminum AA6061. The electrical motor was energized and the skim centrifuge (the bowl, skim and top assembly) began to turn. After about one minute the bowl had reached 300-rpm and it was spun for an additional minute at speeds up to 400-rpm. The assembly spun quiescently well within the inner diameter of the five-foot diameter collection station. As the bowl was spun, molten aluminum was ejected from the peripheral gaps in the assembly. The spinning was stopped when no more aluminum was observed to flow from the skim centrifuge.

The aluminum ejected from the centrifuge impacted upon the collector station's deflectors and flowed into the peripheral trough and collector pans. The residue was found to have shifted position such that there was an empty cylindrical core from the top to the bottom of the bowl.

It was found that 780-pounds of metal product were collected and 275-pounds of residue were left in the skim centrifuge. Thus the reconstructed load was 1055-pounds of skim. The product was induction remelted in two batches and a net aluminum cast from the remelt was 757-pounds. Thus real recovery was near 72% of the input skim. The residue was readily friable. From samples of crushed and analyzed residue it was found to contain 88-pounds or approximately 32% metal.

While the invention has been particularly shown and described with reference to preferred embodiments, it will be understood by those skilled in the art that various changes in form and detail may be made therein without departing from the spirit and scope of the invention. The claims appended hereto are intended to encompass all embodiments which fall within the spirit and scope of the invention.

What is claimed is:

1. An apparatus for the separation of an enriched liquid phase from a mixture of liquid and solid phases containing at least 20% liquid comprising:
   a container of generally circular cross-section to hold the aforesaid mixture and retain a solid-enriched residue said container being closeable and with the provision for at least one peripheral opening of controlled size;
   a non-rotatable support from which to provide both a means of transmitting rotational force and of providing mechanical support;
   a connecting and supporting means between the aforesaid means of both transmitting rotational force and of providing mechanical support and the aforesaid container comprising at least two, interconnecting, supporting, links which fit together loosely, and at least one component of which has a compound arcuate mating surface such that the region of contact between said links during rotation of said container is as close as practically possible to points or lines of contact, thus permitting said container to rotate smoothly in a controlled manner, in an earth-strength gravitational force field, during the change of mass as enriched liquid phase is expelled from said container and as the enriched-in-solids-mass remaining in said container may change position.

2. An apparatus of claim 1 in which the aforesaid container has the general shape of a conical frustrum with the closeable end having both the major diameter and means to provide at least one dimensionally controlled opening, said opening being only required to be open when the container is rotated to expel liquid enriched phase.

3. An apparatus of claim 1 in which further comprises means for braking the rotational motion.

4. An apparatus of claim 1 in which the interconnecting, supporting links are loosely fitting, mechanically-stiff, and whose mutually interacting surfaces consist of at least one surface which is compound arcuate in configuration thereby minimizing the contact area both at rest and under rotation.

5. An apparatus of claim 1 in which the cross-section of the container is generally that of a regular polygon.

6. An apparatus of claim 1 in which one interconnecting link has the form of a safety hook whose free internal depth is at least about twice that of the major solid dimension of the mating link and one mating link is in the general configuration of a mechanical eye with an internal, open diameter at least about twice that of the major solid dimension of the mating link.

7. An apparatus of claim 1 which further comprises at least one set of redundant, concentric bearings between the aforesaid non-rotatable, load-carrying support and the aforesaid means of transmitting rotational force and providing mechanical support.

8. An apparatus of claim 1 which further comprises at least one set of redundant, concentric bearings between the aforesaid non-rotatable, load-carrying support and the aforesaid means of transmitting rotational force and providing mechanical support with one of said pair of redundant, concentric bearings being immobilized by a means which is frangible at a predetermined force level.

9. An apparatus of claim 1 further comprising an enriched-liquid-phase collection station which is generally cylindrical, is mounted substantially to remain motionless, and has a vertical axis and at least one open end, and is sufficient in size to more than completely, encase horizontally the aforesaid container while said container is suspended and rotated and is further equipped with means to collect the enriched-liquid-phase ejected during rotation of the said container.

10. An apparatus for treating hot aluminous skim material containing at least 20% liquid aluminum capable of being separated to separate and recover aluminum contained therein comprising:
an open bowl of generally circular cross-section capable of being preheated, heated or insulated or a combination thereof such that no appreciable quantity of the input, liquid metallic phase is solidified;
a generally circular cover for the opening of said bowl, said generally circular cover and having means to mechanically lock with said bowl and having means to produce at least one, dimensionally controlled, peripheral gap between said bowl and said generally circular cover, the said two parts forming a centrifuge body;
a linkage member firmly mounted axially to said centrifuge body at the approximate geometric center of the upper surface of said centrifuge body and by which said centrifuge body may be suspended and rotated or braked-from-rotating and said linkage member having inner contactable surfaces which are arcuate;
a non-rotatable, load-carrying housing containing a source of rotational power which drives a load-bearing rotatable shaft which has a lower end terminating in a member whose contactable inner surface is compound-arcuate and whose inner breadth and depth are such that the aforesaid linkage member can fit loosely therein and in close approximation of line or points contact and be fully contained therein during rotation and capable of suspending and rotating the aforesaid centrifuge body and its load.

11. An apparatus of claim 10 in which the linkage between the rotatable shaft and the centrifuge body comprises at least two loosely fitting, supporting, connecting arcuate links whose regions of mutual contact are arcuate such as to closely approach points or lines of contact between said links and each link has an open containment region at least about twice the major, solid, cross-sectional dimension of the mating link to assure free, low frictional movement between said links.

12. An apparatus of claim 10 in which the container is sufficient in size to hold at least 500-pounds of hot, aluminous skim and is in the general shape of a conical frustrum with one end closed and the other end open, said open end having the major internal diameter and having at said major diameter a dimensionally controlled opening for the aforesaid enriched-liquid-phase to leave the container during rotation.

13. An apparatus of claim 10 for treating hot, aluminous skim material containing over 50 per cent liquid aluminum capable of being separated from the solid enriched phase.

14. An apparatus of claim 10 which further comprises at least one set of redundant, concentric bearings between the aforesaid non-rotatable, load-carrying support and the aforesaid linking means of transmitting rotational force and providing mechanical support.

15. An apparatus of claim 10 which further comprises at least one set of redundant, concentric bearings between the aforesaid non-rotatable, load-carrying support and the aforesaid linking means of transmitting rotational force and providing mechanical support with one of said pair of redundant, concentric bearings being immobilized by a means which is frangible at a predetermined force level.

16. An apparatus of claim 10 further comprising an aluminum product collection station which is generally cylindrical, is mounted substantially to remain motionless, and has a vertical axis and at least one open end, and is sufficient in size to more than completely, encase horizontally the aforesaid centrifuge body while said centrifuge body is suspended and rotated and said collection station is further equipped with means to collect the enriched aluminum metallic product which is ejected from the skim during rotation of the said centrifuge body.

* * * * *